(12) United States Patent
Huebel

(10) Patent No.: US 10,202,010 B2
(45) Date of Patent: Feb. 12, 2019

(54) MOTOR VEHICLE

(71) Applicant: Bayerische Motoren Werke Aktiengesellschaft, Munich (DE)

(72) Inventor: Claus Huebel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 335 days.

(21) Appl. No.: 14/792,322

(22) Filed: Jul. 6, 2015

(65) Prior Publication Data

US 2015/0306931 A1   Oct. 29, 2015

Related U.S. Application Data

(63) Continuation of application No. PCT/EP2013/075940, filed on Dec. 9, 2013.

(30) Foreign Application Priority Data

Jan. 7, 2013 (DE) ........................ 10 2013 200 100

(51) Int. Cl.
 *B60D 1/48* (2006.01)
 *B60D 1/56* (2006.01)
 *B62D 25/08* (2006.01)

(52) U.S. Cl.
 CPC ............. *B60D 1/485* (2013.01); *B60D 1/488* (2013.01); *B60D 1/565* (2013.01); *B62D 25/08* (2013.01)

(58) Field of Classification Search
 CPC ........ B60D 1/485; B60D 1/488; B60D 1/565; B62D 25/08

USPC ......................................................... 280/495
See application file for complete search history.

(56) References Cited

U.S. PATENT DOCUMENTS

| | | | | |
|---|---|---|---|---|
| 6,161,867 A | * | 12/2000 | Tamura ................... | B60R 19/02 180/69.1 |
| 6,382,654 B1 | * | 5/2002 | Mahncke ............... | B60D 1/488 280/491.1 |
| 8,371,602 B1 | * | 2/2013 | Peschansky ............. | B60D 1/04 280/446.1 |
| 8,714,592 B1 | * | 5/2014 | Thoreson ............... | B60D 1/488 280/769 |
| 2009/0108566 A1 | | 4/2009 | Asjad | |
| 2011/0215617 A1 | | 9/2011 | Izutsu et al. | |

FOREIGN PATENT DOCUMENTS

| | | |
|---|---|---|
| DE | 41 04 671 A1 | 8/1992 |
| DE | 197 15 874 A1 | 10/1998 |
| DE | 199 41 000 A1 | 3/2001 |
| DE | 100 59 497 A1 | 7/2001 |

(Continued)

OTHER PUBLICATIONS

German Office Action dated Jul. 22, 2013, with English Translation.
European International Search Report dated Apr. 1, 2014.

*Primary Examiner* — Jacob D Knutson
(74) *Attorney, Agent, or Firm* — Crowell & Moring LLP

(57) ABSTRACT

A motor vehicle is provided having a towing lug at a front end of the motor vehicle. The towing lug is directly accessible. A longitudinal axis of the towing lug is arranged substantially vertical or downward at an angle, such that a free end of the towing lug, at which a lug section of the towing lug is formed, points downward in the direction of a roadway.

19 Claims, 2 Drawing Sheets

(56) References Cited

FOREIGN PATENT DOCUMENTS

| | | | |
|---|---|---|---|
| DE | 10059497 A1 * | 7/2001 | ............. B60D 1/488 |
| DE | 101 07 965 A1 | 8/2002 | |
| DE | 101 07 966 A1 | 8/2002 | |
| DE | 10107965 A1 * | 8/2002 | ............. B60D 1/488 |
| DE | 602 14 652 T2 | 9/2007 | |
| JP | 2013-035461 A | 2/2013 | |

* cited by examiner

MOTOR VEHICLE

CROSS REFERENCE TO RELATED APPLICATIONS

This application is a continuation of PCT International Application No. PCT/EP2013/075940, filed Dec. 9, 2013, which claims priority under 35 U.S.C. § 119 from German Patent Application No. 10 2013 200 100.2, filed Jan. 7, 2013, the entire disclosures of which are herein expressly incorporated by reference.

BACKGROUND AND SUMMARY OF THE INVENTION

From German Patent document DE 41 04 671 A1, a motor vehicle is known, wherein a towing lug is fastened to a lower supporting structure (front axle support) and points forward in the direction of an end face of a front end assembly of the motor vehicle in the horizontal direction.

It is an object of the invention to provide a motor vehicle with a towing lug, which is directly accessible, on a forward end of the motor vehicle.

This and other objects are achieved by a motor vehicle according to the invention having a vehicle body with a vehicle occupant compartment. A front end assembly is disposed in front of the vehicle occupant compartment. The front end assembly has an upper supporting structure and a lower supporting structure. The two supporting structures are connected with one another. The upper supporting structure has two side members which are mutually spaced in the transverse direction of the vehicle. Below the two side members, the lower supporting structure is connected with the upper supporting structure by way of at least one fastening point. A towing lug is arranged on the lower supporting structure.

A longitudinal axis of the towing lug is advantageously arranged essentially vertically or diagonally downward at an angle, so that a free end of the towing lug, on which a lug section of the towing lug is formed, points downward in the direction of a roadway.

In an advantageous embodiment, the towing lug is inclined toward the front at an angle $\alpha$ with respect to a vertical axis in the longitudinal direction of the vehicle. The angle $\alpha$ is advantageously in a range of $0° \leq \alpha \leq 10°$.

In an advantageous embodiment, the towing lug has a threaded shaft. The threaded shaft of the towing lug is screwed to an internal thread in a towing-lug receiving device formed in the lower supporting structure.

Advantageously, one node respectively is formed in the lower supporting structure. Each respective node connects a longitudinal section and a transverse section of the lower supporting structure with one another. A towing lug is fastened to at least one of the two nodes.

In an advantageous embodiment, the lug section of the towing lug projects in the vertical direction toward a roadway so far beyond a lower edge of a front covering of the front end assembly that towing devices used during a towing operation will not contact the lower exterior surface of the front covering.

The longitudinal axis of the towing lug is advantageously perpendicular to the transverse direction of the vehicle.

In an advantageous embodiment, the towing lug has a sufficient distance from an interior wall of an adjacent wheel, even at a maximal steering angle of the wheel toward a vehicle center.

In an arrangement of a towing lug on a motor vehicle according to the invention at a lower supporting structure, the towing lug will be directly accessible, without having to remove a lid in a covering. By being able to screw the towing lug in the towing lug receiving device to the internal thread, a simple handling of the towing lug is achieved during the mounting and demounting.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
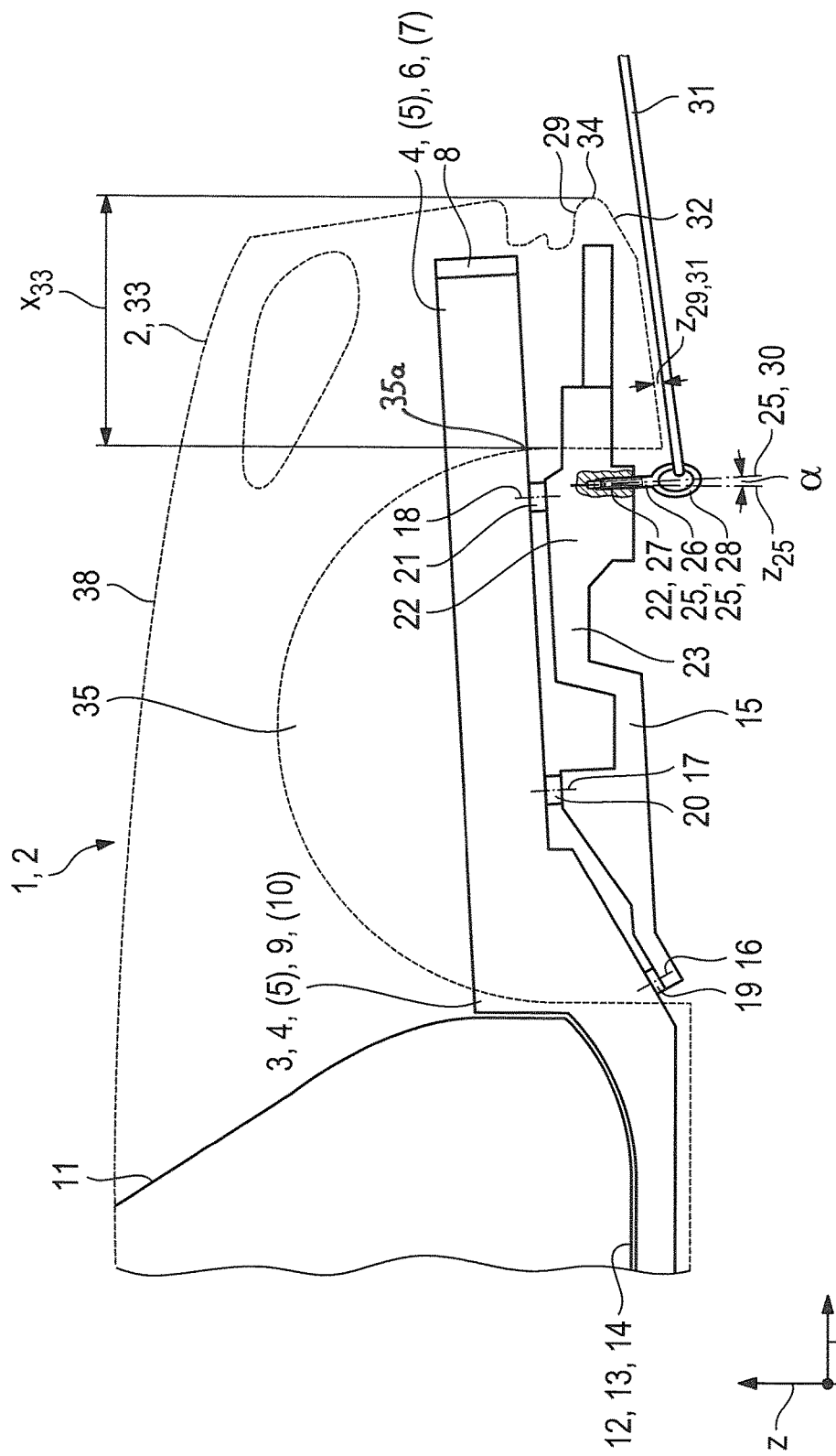
FIG. 1 is a schematic representation of a lateral view of an upper supporting structure and a lower supporting structure on a front end assembly of a motor vehicle.

FIG. 1 illustrates a front end assembly 2 of a motor vehicle 1. In the front end assembly 2, an upper supporting structure 3 is constructed which has two side members 4, 5 spaced with respect to one another in the transverse direction y of the vehicle. In the illustrated embodiment, the upper supporting structure 3 is used as an engine support.

In the illustrated embodiment, the side members 4, 5 are mutually connected at their respective forward end 6, 7 by way of a cross member 8. A respective rearward end 9, 10 of the respective side member 4, 5 is arranged on a front face 11 and then extends to a floor 12 of a vehicle body 13. The vehicle body 13 has a vehicle occupant compartment 14.

A lower supporting structure 15 is constructed below the upper supporting structure 3. The lower supporting structure 15 is designed as a front axle support. In the illustrated embodiment, the lower supporting structure 15 is connected at three fastening points 16, 17, 18 respectively with the respective side member 4, 5 by way of fastening elements 19, 20, 21.

Figure 2:
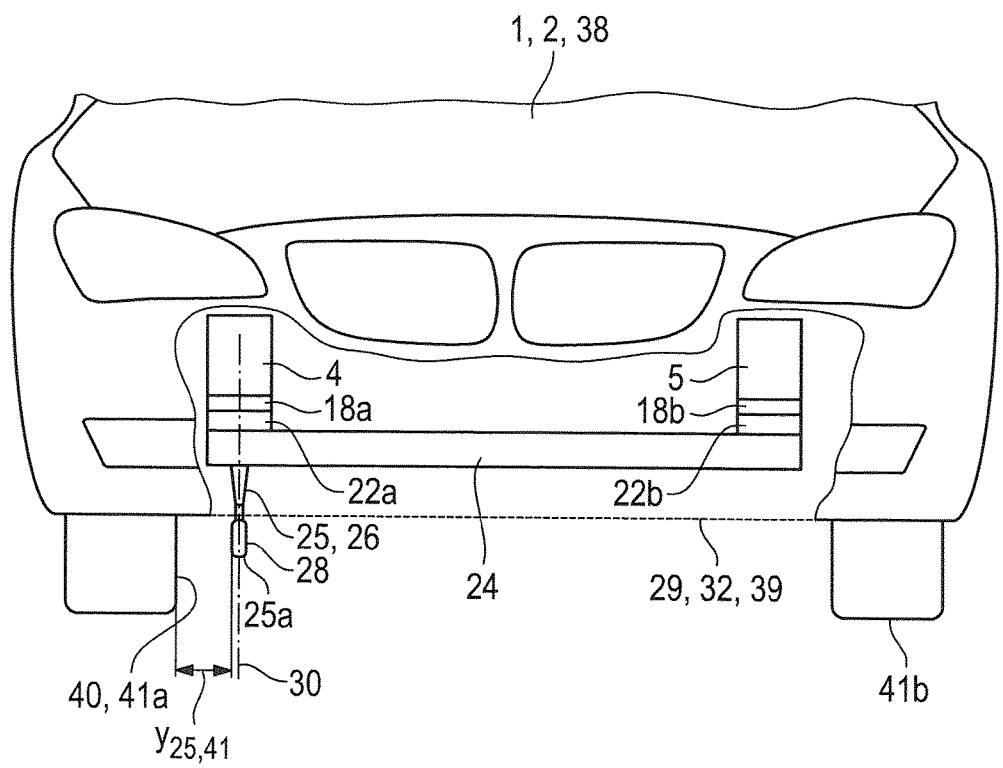
FIG. 2 is a view from the front onto a partially cut forward end of the front end assembly.

A frontal node 22 of the lower supporting structure 15 mutually connects a longitudinal section 23 of the lower supporting structure 15 with a transverse section 24 of the lower supporting structure 15 illustrated in FIG. 2. A towing lug receiving device is provided in the frontal node 22 and has a borehole 27 provided with an (internal) thread. A shaft 26 of a towing lug 25 having an (external) thread is screwed into the borehole 27 of the towing lug receiving device.

A lug section 28 of the towing lug 25 is arranged below a front covering 29, in the direction of a roadway (not shown). The front covering 29 is illustrated by broken lines in FIG. 1.

In the illustrated embodiment, the towing lug 25 is inclined with its longitudinal axis 30 at an angle $\alpha$ with respect to a vertical line $z_{25}$. In the illustrated embodiment, the longitudinal axis 30 extends in a diagonally inclined manner toward the front in the direction of the longitudinal direction x of the vehicle.

The lug section 28 projects so far beyond the adjacent front covering 29 that a towing device 31, such as a cable or a tow bar, has a sufficient distance $z_{29, 31}$ at the lower exterior surface 32 of the front covering 29 pointing toward the road.

In FIG. 1, an overhang 33 of a forward end 34 of the front end assembly 2 is also visible. The overhang 33 extends between a forward end 35a of a wheel well 35 and the forward end 34 of the front end assembly 2 along a length $x_{33}$. On the top side of the front end assembly 2, the upper forward end 34 of the front end assembly 2 is adjoined by an engine hood 38. In the illustrated embodiment, the respective position of the nodes 22a and 22b and, therefore, the position of the towing lug 25 is at the level of the forward end 35a of the respective wheel well 35.

The representation of FIG. 2 indicates that the towing lug 25 projects beyond a lower edge 39 of the front covering 29. FIG. 2 further shows that the towing lug 2 is perpendicularly aligned with respect to the transverse direction y of the vehicle, i.e. has no angle of inclination.

In addition, FIG. 2 illustrates the position of the respective side member 4 and 5, the position of the respective fastening point 18a, 18b, as well as the respective position of the nodes 22a and 22b and the transverse section 24 of the lower supporting structure 15.

FIG. 2 indicates that a sufficient spacing $y_{25,\ 41(a)}$ exists between an interior wall 40 of the wheel 41a, even in the case of a maximal steering angle of the wheel 41a toward a vehicle center.

The upper supporting structure 3 formed by the two mutually spaced side members 4, 5 is a first upper load path. The lower supporting structure 15 formed by the subframe is a second lower load path. The force applied by the towing lug 25 during a towing operation is therefore introduced into the lower supporting structure 15 and thereby into the second lower load path.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a vehicle body which forms a vehicle occupant compartment, comprising:
    a front end assembly disposed in front of the vehicle occupant compartment, the front end assembly having an upper supporting structure and a lower supporting structure that is an axle support, wherein
    the upper and lower supporting structures are connected with one another,
    the upper supporting structure has two side members, which are mutually spaced in a transverse direction y of the vehicle,
    below the two side members, the lower supporting structure is connected with the upper supporting structure by way of at least one fastening point, and
    a towing lug is arranged on the lower supporting structure, wherein a longitudinal axis of the towing lug is arranged essentially vertically or diagonally downward, so that a free end of the towing lug, on which a lug section of the towing lug is formed, points downward toward a roadway.

2. The motor vehicle according to claim 1, wherein the towing lug is inclined toward the front of the vehicle at an angle α with respect to a vertical axis z in a longitudinal direction of the vehicle.

3. The motor vehicle according to claim 1, wherein the angle α is in a range of $0° \leq \alpha \leq 10°$.

4. The motor vehicle according to claim 3, wherein the towing lug has a threaded shaft, the threaded shaft of the towing lug being screwable into a towing lug receiving device formed in the lower supporting structure.

5. The motor vehicle according to claim 4, wherein the towing lug receiving device has a borehole provided with an internal thread.

6. The motor vehicle according to claim 1, wherein the towing lug has a threaded shaft, the threaded shaft of the towing lug being screwable into a towing lug receiving device formed in the lower supporting structure.

7. The motor vehicle according to claim 6, wherein the towing lug receiving device has a borehole provided with an internal thread.

8. The motor vehicle according to claim 1, wherein
    one node, respectively, is formed in the lower supporting structure on each lateral side of the vehicle,
    the respective node connects a longitudinal section and a transverse section of the lower supporting structure with one another, and
    the towing lug is fastened to at least one of the respective nodes.

9. The motor vehicle according to claim 8, wherein the lug section of the towing lug projects in a vertical direction z toward the roadway so far beyond a lower edge of a front covering of the front end assembly that towing devices used during a towing operation will not contact a lower exterior surface of the front covering.

10. The motor vehicle according to claim 1, wherein the lug section of the towing lug projects in a vertical direction z toward the roadway so far beyond a lower edge of a front covering of the front end assembly that towing devices used during a towing operation will not contact a lower exterior surface of the front covering.

11. The motor vehicle according to claim 10, wherein the longitudinal axis of the towing lug is situated perpendicular to the transverse direction y of the vehicle.

12. The motor vehicle according to claim 11, wherein the towing lug has a sufficient distance to an interior wall of an adjacent wheel such that there is no contact even in an event of a maximal steering angle of the wheel toward a vehicle center.

13. The motor vehicle according to claim 1, wherein the longitudinal axis of the towing lug is situated perpendicular to the transverse direction y of the vehicle.

14. The motor vehicle according to claim 1, wherein the towing lug has a sufficient distance to an interior wall of an adjacent wheel such that there is no contact even in an event of a maximal steering angle of the wheel toward a vehicle center.

15. A front end assembly of a motor vehicle having a vehicle occupant compartment, comprising:
    an upper supporting structure comprising two side members mutually spaced apart in a transverse direction of the vehicle;
    a lower supporting structure that is an axle support connected with the upper supporting structure below the two side members via one or more fastening points; and
    a towing lug having a free end on which a lug section is formed, wherein
    a longitudinal axis of the towing lug is oriented so that the free end points downward in a direction of a roadway.

16. The front end assembly according to claim 15, wherein the longitudinal axis of the towing lug extends diagonally downward inclined toward a front at an angle α with respect to a vertical axis in a longitudinal direction of the vehicle.

17. The front end assembly according to claim 16, wherein the angle α is in a range of $0° \leq \alpha \leq 10°$.

18. The front end assembly according to claim 15, further comprising:
- a towing lug receiving device formed in the lower supporting structure, the towing lug receiving device being configured to threadably connect with a shaft of the towing lug.

19. The front end assembly according to claim 15, wherein the lower supporting structure has two longitudinal sections mutually spaced in the transverse direction of the vehicle and a transverse section connecting the two longitudinal sections with one another, and
- wherein a node is respectively formed at each connection of the transverse section to a respective longitudinal section, and
- wherein the towing lug is fastened to at least one of the nodes.

\* \* \* \* \*